April 12, 1927.  
S. B. WINN  
1,623,990  
TRACTOR TRAILER SAFETY COUPLING DEVICE  
Filed Dec. 8, 1924   3 Sheets-Sheet 1
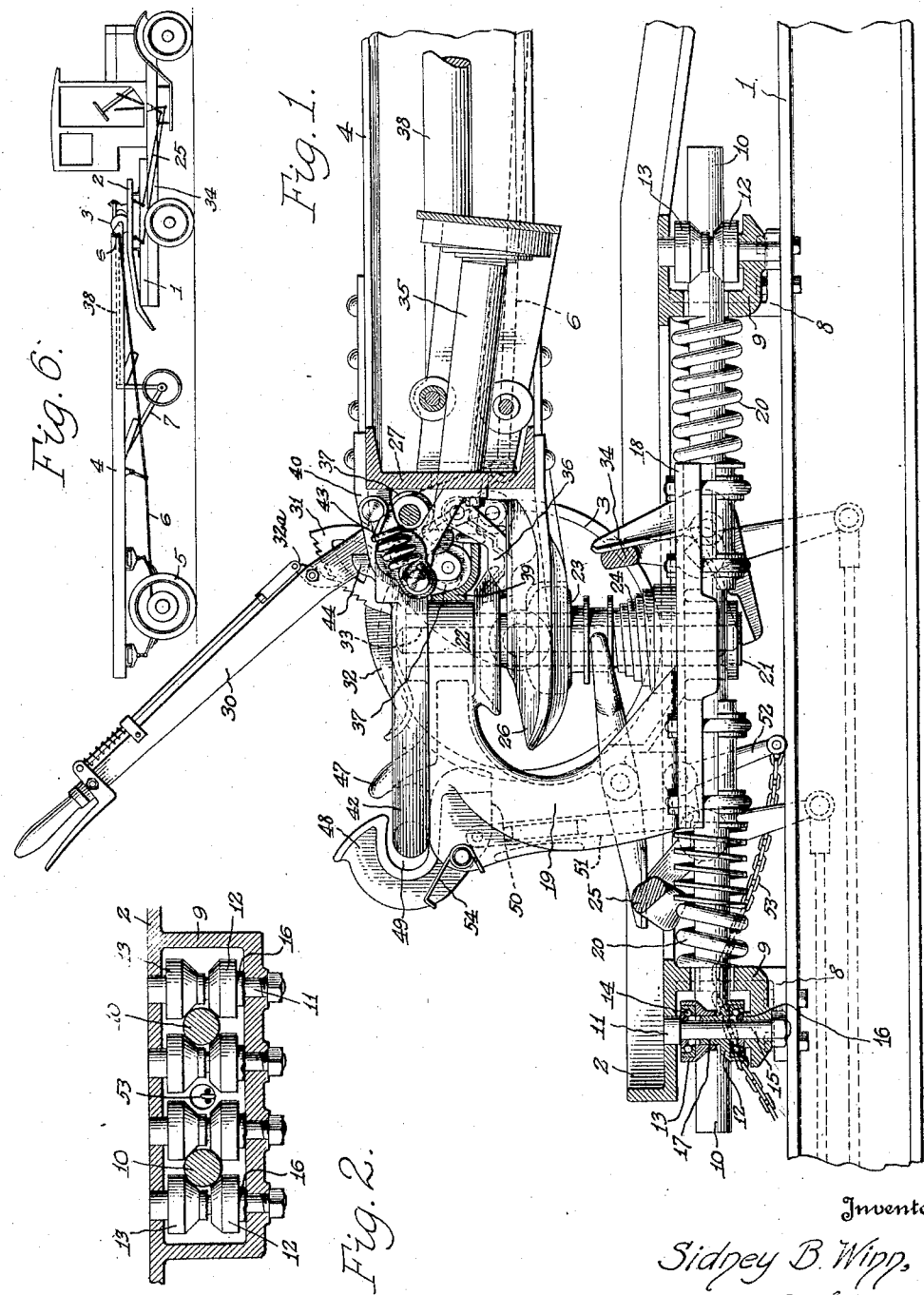
Inventor  
Sidney B. Winn,  
By  
Attorneys

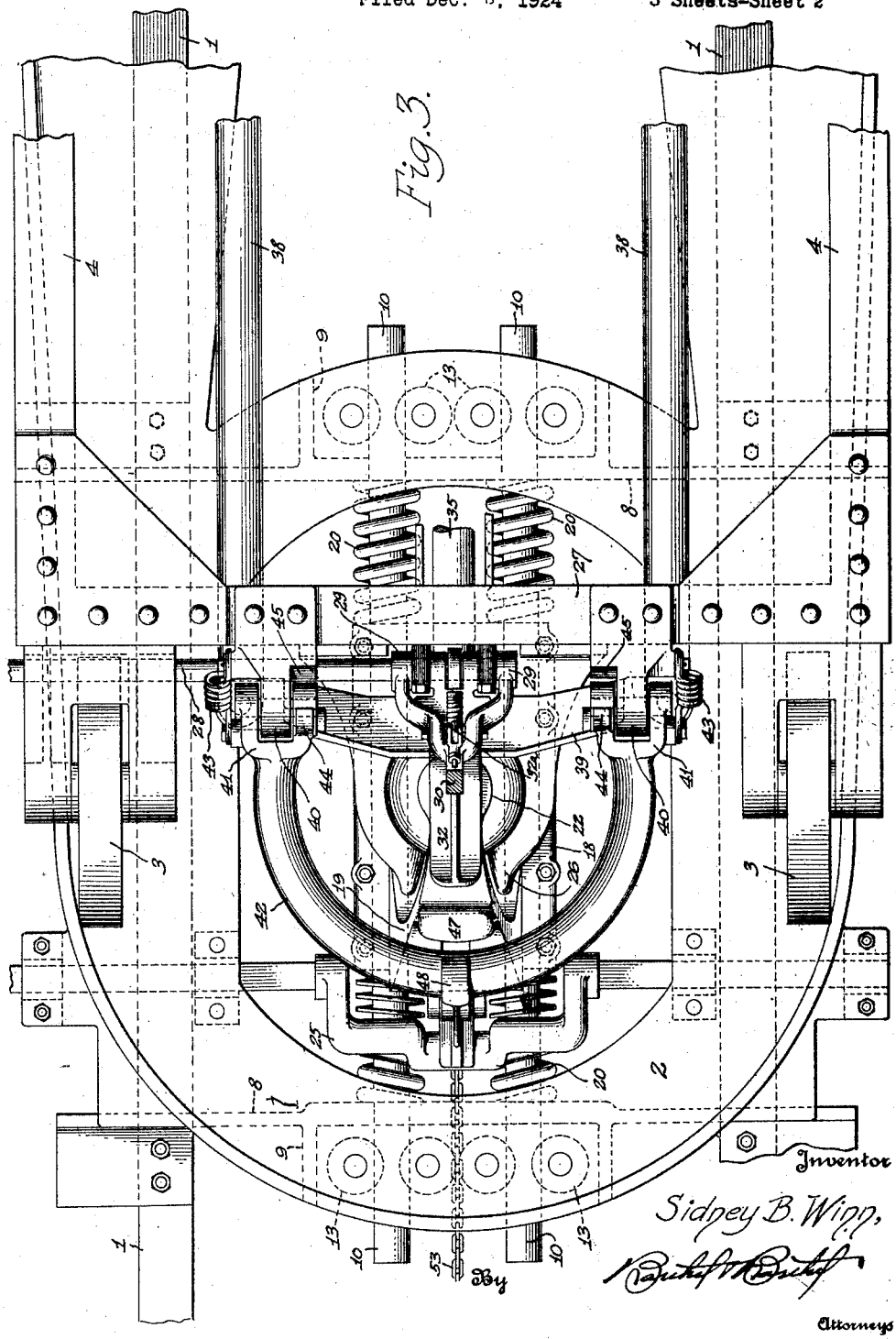

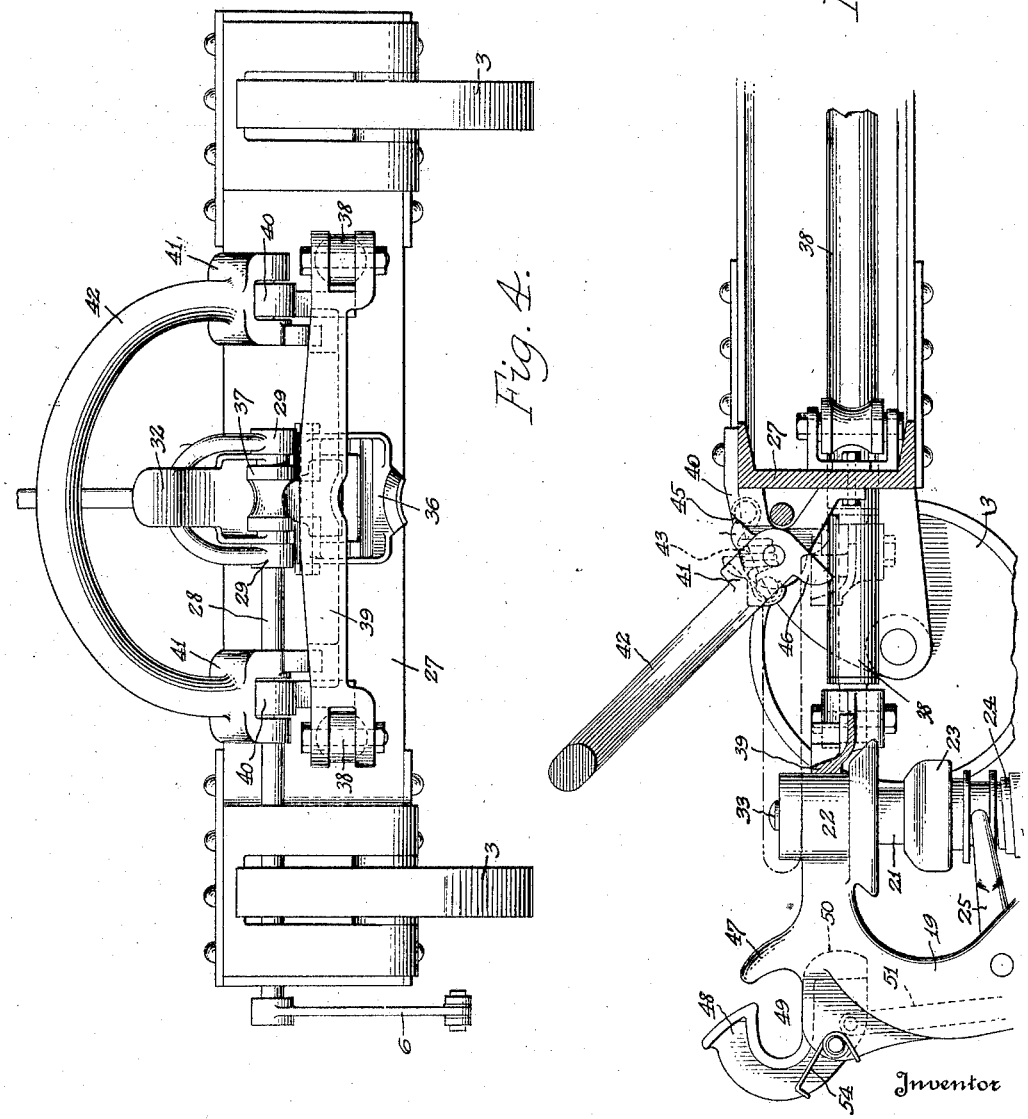

Patented Apr. 12, 1927.

1,623,990

UNITED STATES PATENT OFFICE.

SIDNEY B. WINN, OF LAPEER, MICHIGAN.

TRACTOR-TRAILER SAFETY COUPLING DEVICE.

Application filed December 8, 1924. Serial No. 754,570.

This invention relates to a tractor trailer combination that may be briefly described as including a trailer adapted to have its forward end supported on and attached to the rear end of the tractor, with the forward end of the trailer provided with a shiftable supporting leg and brake mechanism so that the forward end of the trailer may be safely supported, with or without the brakes applied, when not supported on the tractor. With the brakes released the trailer may be moved about and the brake mechanism is such that it may be controlled from the tractor when the trailer is attached thereto. The tractor includes, among other things, a track to facilitate placing the forward end of the trailer on the rear end of the tractor; a fifth wheel table to permit of the tractor turning relative to the trailer; a main coupling mechanism by which the forward end of the trailer may be connected to the rear end of the tractor; a draft mechanism establishing a yieldable connection between the tractor and trailer; a mechanism operatable by the tractor for shifting the supporting leg on the trailer, and a mechanism operatable from the tractor for controlling the brakes of the trailer.

This invention has special reference to an auxiliary safety coupling device between the tractor and trailer in addition to the main coupling mechanism.

The invention also has special reference to certain improvements and refinements in connection with the draft mechanism establishing a yieldable connection between the tractor and trailer, and as an early example of such draft mechanism reference may be had to my prior Patent No. 1,249,705, dated Dec. 11, 1917. In this patent the shiftable coupling supporting rods are slidable in transverse beams, and in lieu of these beams I provide a series of anti-frictional rollers for supporting said rods. The rollers are of special design so as to be adjustable to compensate for wear incident to actuation of the draft appliance due to pulling, stopping and starting of the tractor trailer combination.

My improvements will be hereinafter specifically described, and then claimed, and reference will now be had to the drawings, wherein—

Figure 1 is a longitudinal sectional view, partly in elevation of a portion of a tractor trailer combination, illustrating the tractor draft appliance, the forward end of the trailer, and the main and auxiliary coupling mechanisms;

Fig. 2 is a cross sectional view of a portion of the tractor draft appliance showing my improved anti-frictional adjustable rollers;

Fig. 3 is a plan of that part of the tractor trailer combination shown in Fig. 1, with a hand brake lever in horizontal section;

Fig. 4 is a view of the front end of the trailer showing the auxiliary or safety coupling device;

Fig. 5 is a longitudinal sectional view of a portion of the tractor trailer combination showing a tractor member about to be coupled to a trailer and the safety coupling device actuated by virtue of the tractor member actuating leg shifting means of the trailer, and Fig. 6 is a diagrammatic view, in elevation, of a tractor trailer combination.

In order that the relation of the principal parts of a tractor trailer combination may be understood, I have shown in Fig. 6 a tractor 1 having a fifth wheel table 2 and resting on this table are rollers or wheels 3 at the forward end of a trailer 4. The trailer 4 has the usual rear end truck 5 provided with a brake mechanism 6 which may be controlled from the tractor; automatically actuated when the trailer crowds the tractor, operated by hand when the trailer is detached from the tractor, and automatically controlled incident to coupling or uncoupling of the trailer and tractor. The trailer has a shiftable supporting leg 7 and extending forwardly from said leg are leg shifting means normally protruding from the forward end of the trailer. Between the forward end of the trailer and the rear end of the tractor is a main coupling mechanism that may be controlled from the tractor. It is believed that this outline of the tractor trailer combination is sufficient for the better understanding of certain improvements to be described by aid of the remaining views of the drawings, and reference will now be had to Figs. 1, 2 and 3 for the improvement in connection with a draft appliance carried by the tractor 1 under the fifth wheel table 2.

On the chassis or side frames of the tractor 1 are transverse beams 8 which support the table 2 and may be integral therewith as shown. Intermediate the ends of the beams 8 are housings 9 and in each housing are a series of anti-frictional rollers arranged in sets with the rollers of one housing in longitudinal alinement with the rollers of the other housing so that sets of said rollers may cooperate in supporting draft rods or bars 10.

Each anti-frictional roller is held in place by a vertically disposed nut equipped bolt 11 having its upper end or head loose in the upper wall of the housing 9 so that said bolt may be adjusted relative to said housing. Each roller includes conical members 12 and 13, the latter being adjustable by the bolt 11 relative to the former and both of said members are held relative to the bolt by anti-frictional bearings 14 and 15, the former being engaged by the head of the bolt and the latter engaging a boss 16 provided therefor on the lower wall of the housing 9. The roller member 12 has a sleeve portion 17 telescoped by the member 13 and as the conical members 12 and 13 become worn the bolt 11 may be adjusted to lower the conical member 13 towards the conical member 12 and thus eliminate any lost motion or sloppy movement of the draft rod between the conical roller members.

Mounted on the draft rods or bars 10, intermediate the ends thereof, is the base 18 of a hollow tractor member 19, and encircling the draft rods or bars 10, between the housings 9 and the ends of the base 18 are two sets of springs 20, which afford a yieldable connection between the tractor 1 and the trailer 4, the springs absorbing strains incident to pulling, stopping, starting, and irregular road conditions.

The tractor member 19 forms part of a main coupling mechanism which includes, among other things, a tubular king bolt 21; an abutment or head 22; a ball coupling member 23; a supporting spring 24; a mechanism, generally designated 25, operatable from the tractor for lowering the ball coupling member 23, and a socket coupling member 26 carried by the forward transverse end frame 27 of the trailer 4 and adapted to receive the ball coupling member 23 to establish a coupled relation between the tractor and trailer.

The brake operating mechanism 6 of the trailer 4 includes a transverse rock shaft 28 journaled in bearings carried by the end frame 27 of the trailer and on the rock shaft is mounted the forked end 29 of a hand lever 30 by which the trailer brakes may be actuated when the trailer is detached from the tractor. Loosely mounted on the rock shaft 28 is a sector rack 31 and an operative relation between this rack and the hand lever 30 may be established by a hand controlled pawl 32ª carried by the lever 30. The sector rack 31 has a shoe 32 adapted to be engaged by the head 22 of the tractor coupling member 19, and this shoe 32 is adapted to be engaged by a brake actuating pin 33 slidable in the tubular king bolt 21 with the lower end of said pin engaged by an operating mechanism, generally designated 34, adapted to be operated from the tractor 1, so that the driver of the tractor may set the trailer brakes at will. It is also by virtue of this mechanism that the trailer brakes are brought into action by the trailer attempting to crowd or push the tractor. The said mechanism permits of the trailer brakes being manually controlled when the trailer is independent of the tractor. If the trailer brakes are not applied when the tractor is to be backed into engagement with the trailer, the trailer brakes are set by hand.

The brake mechanism between the tractor and trailer also includes a spring distended member 35 suitably supported by the end frame 27 of the trailer 4 and the forward end of this member has a drag link 36 engageable under the head 22 of the tractor coupling member 19 so that said tractor coupling member may pull the member 35 forward as the tractor moves away from the trailer. The member 35 is adapted to engage under rollers 37 carried by the sector rack 31, whereby the sector rack 31 will be elevated by the member 37 to hold the trailer brakes set or applied as the tractor leaves the trailer.

The leg shifting means of the trailer includes two parallel draw rods or bars 38 protruding from the forward end frame 27 of the trailer with the forward ends of the rods 38 connected by a cross head 39 adapted to be engaged by the abutment or head 22 of the tractor member 19, as the tractor is coupled to the trailer, rearward movement of the cross head 39 causing the support leg 7 of the trailer 4 to be elevated to an inactive position as long as the tractor is coupled to the trailer. When the tractor moves away from the trailer, the drag link 36 of the member 35 causes said member to impinge against the cross head 39, thereby shifting the cross head forward and thus imparting movement to the supporting leg, which movement is in an opposite direction to that imparted to the supporting leg when connecting the tractor and trailer. In other words, the leg shifting means may be actuated by the tractor for two purposes. In passing, it is to be noted that the rods 38 function for leg raising purposes, somewhat similar to the single rod or bar shown in my prior Patent No. 1,372,922, dated March 29, 1921, or the single bar shown in my Patent No. 1,378,749, dated May 17, 1921, thus indicating that the tractor trailer construction herein disclosed is not limited to a parallel arrangement of leg shifting rods or bars.

Now considering one of the features of this invention, the forward end frame 27 of the trailer 4 is provided with a set of brackets 40 with the brake rock shaft 28 extending through one of the brackets 40. Pivotally connected to the brackets 40 are the forked ends 41 of a bail shaped auxiliary coupling member 42 and the forked ends of this coupling member are connected by coiled retractile springs 43 to said brackets with said springs arranged to swing the coupling member 42 upwardly and hold it at an angle to the horizontal; the open or raised position of the coupling member being defined by stop lugs 44 of the coupling member engaging stop shoulders 45 of the brackets 40. This is best shown in Fig. 5, also lugs 46 carried by the ends of the coupling member 42 and adapted to be engaged by the cross head 39 to lower the coupling member 42 to a closed or coupled position as the tractor becomes attached to the trailer by the main coupling.

It is to be noted that the cross head 39 has a configuration suitable for engagement with the lugs 46 and the abutment or head 22 of the tractor member 19, said cross head also providing clearance for previously mentioned parts of the brake operating mechanism.

On the forward part of the hollow tractor member 19 is a horn 47 which cooperates with a pivoted spring pressed latch 48 in forming a socket or keeper 49 for the pivoted spring elevated coupling member 42. The latch 48 is of such configuration that the coupling member 42 may impinge against the latch and snap into a socket or keeper 49, said latch including a jaw 50 that may be engaged by the coupling member 42 to assist in closing the latch. Connected to the jaw 50 of the latch is a latch operating mechanism including a link 51 arranged in the hollow tractor member 19 and operatively connected to a bell crank 52 in the lower part of base 18 of the tractor member 19. Attached to the bell crank 52 is a flexible connection 53 that may be trained through the uppermost housing 9 of the draft appliance and extend forwardly so that the driver of the tractor may manually open the latch 48 against the action of a spring 54 associated with said latch. By reference to Fig. 1, it will be noted that the closed and coupled position of the member 42 is below the plane of the pivots of said coupling member, consequently the retractile force of the springs 43 will tend to hold the coupling member 42 at all times within the socket or keeper 49 during service of the tractor relative to the trailer. When the latch 48 is manually actuated the jaw 50 tends to kick the coupling member 42 upwardly until the outer end of the coupling member is above the horizontal pivotal plane of said member, when the spring 43 functions to raise the coupling member to the open position defined by the stop lugs and shoulders 44 and 45 respectively.

It is now apparent that the coupling member 42 cooperates with the tractor member 19 in providing an auxiliary or safety coupling between the tractor and trailer, in addition to the main coupling, and that the configuration of the coupling member 42 is such as not to interfere with turning of the tractor relative to the trailer. The coupling member also provides ample clearance for the main coupling and brake operating mechanism, and it is believed that the utility of the improvements herein set forth will be apparent without further description.

While in the drawings there is illustrated a preferred embodiment of each improvement, it is to be understood that the structural elements are susceptible to such changes as are permissible by the appended claims.

What I claim is:—

1. A coupling device for a tractor trailer combination, comprising a tractor member, a trailer member swingable down over said tractor member; and means carried by said tractor member adapted to retain said trailer member in a closed coupling position, said trailer member being supported to automatically assume an open uncoupled position when released by said means.

2. A coupling device for a tractor trailer combination, comprising a tractor member, a trailer member supported to be actuated by said tractor member, to swing down over said tractor member and assume a coupling position when said tractor member is shifted in proximity to said trailer member, and means carried by said tractor member adapted to retain said trailer member in a closed coupling position.

3. In a tractor trailer combination wherein a main coupling mechanism connects the tractor and trailer; an auxiliary coupling for said tractor trailer combination, said auxiliary coupling being in a plane above the main coupling mechanism and operatable for coupling purposes by the tractor assuming a service relation to the trailer.

4. An auxiliary coupling for a tractor trailer combination as called for in claim 3, wherein a tractor member impinges against a trailer member and establishes a coupled relation between the tractor and trailer.

5. In a tractor trailer combination wherein a tractor is adapted to have its rear end backed under the forward end of the trailer and automatically connected thereto by a main coupling;—a coupling for the tractor and trailer, said coupling including a tractor member forming part of the main coupling, and a trailer coupling member actuated by the tractor member to swing over the main coupling and assume a coupled position relative to the tractor member.

6. A tractor-trailer combination as called for in claim 5, and a latch mechanism, on the tractor member adapted to prevent accidental displacement of the trailer coupling member.

7. The combination of a trailer, a pivoted spring elevated coupling member on the forward end of said trailer, a tractor, a trailer member adapted to cause said trailer coupling member to swing downwardly on to said tractor member, and means on said tractor member for retaining said trailer coupling member in engagement with said tractor member.

8. The combination called for in claim 7, wherein said latch mechanism is operatable through said tractor member from a remote point relative to said tractor member.

9. The combination of a trailer, a shiftable trailer supporting leg at the forward end of said trailer, leg shifting means protruding from the forward end of said trailer and adapted to be engaged to shift said leg to a trailer supporting position, a coupling member on said trailer adapted to be actuated by said leg shifting means, a tractor, and a tractor member adapted to engage said leg shifting means and cause said means to actuate said coupling member and place said coupling member in engagement with said tractor member to establish a coupled relation between said trailer and tractor.

10. The combination called for in claim 9, and a latch mechanism associated with said tractor member for retaining said coupling member in engagement therewith.

11. The combination called for in claim 9, wherein said coupling member is pivoted, and springs are adapted to hold said coupling member in an open position when said tractor is detached from said trailer.

12. The combination called for in claim 9, wherein said coupling member is bail shaped with its ends provided with sets of lugs, one set to limit the movement of said coupling member in one direction, and the other set of lugs to be engaged by said leg shifting means.

13. In a tractor trailer combination, a main tractor and trailer coupling mechanism including a tractor member, an adjustable trailer supporting leg, means engageable by said tractor member for adjusting said supporting leg, and a safety tractor and trailer coupling device having a rear portion actuated by said means to place a front portion of said device in engagement with said tractor member.

14. In a tractor trailer combination, a main tractor and trailer coupling mechanism including a tractor member, an adjustable trailer supporting leg, means engageable by said tractor member for adjusting said supporting leg, and a safety tractor and trailer coupling device actuated by said means, said device including a member swingable over said tractor member.

15. In a tractor trailer combination, a main tractor and trailer coupling mechanism including a tractor member, an adjustable trailer supporting leg, means engageable by said tractor member for adjusting said supporting leg, and a safety tractor and trailer coupling device actuated by said means, said device including a member swingable over said tractor member, and a manually controlled latch mechanism on said tractor member for said coupling member.

16. The combination of a trailer having a rear truck, a shiftable leg adapted for supporting the forward end of said trailer, a cross head at the forward end of said trailer adapted for shifting said leg, a tractor adapted to have its rear end backed under the forward end of said trailer to engage said cross head and shift said leg, and a coupling device actuated by said cross head to couple said tractor and trailer together.

17. The combination called for in claim 16, wherein said coupling device is swingable above said cross head and is adapted to be held in a closed coupled position by said tractor until manually released.

18. In a tractor trailer combination wherein a main coupling connects the tractor and trailer together for combined service operation and permits of said tractor and trailer being disengaged for independent service, and wherein the trailer may be maintained in position when in independent service; a shiftable supporting leg for the forward end of the trailer, shifting means for said leg, said shifting means being engageable by the main coupling of said tractor and trailer to shift said leg in one direction, means associated with said shifting means engageable and disengageable relative to said main coupling for shifting said shifting means in an opposite direction, and an auxiliary coupling engageable by said shifting means to establish an additional connection between said tractor and trailer.

19. A tractor trailer combination as called for in claim 18, wherein said auxiliary coupling includes a member of the main coupling.

20. A tractor trailer combination as called for in claim 18, wherein said auxilarly coupling includes a pivoted bail supported in an open position at an angle to the horizontal and adapted to be swung downwardly over said main coupling.

21. A tractor trailer combination as called for in claim 18, wherein said auxiliary coupling includes a pivoted bail supported in an open position at an angle to the horizontal and adapted to be swung downwardly over said main coupling, said bail being automatically secured in a closed coupled position and adapted to be manually released.

22. In a tractor trailer combination wherein the connection of the tractor to the trailer includes a draft appliance having draft rods movably supported from the tractor;— means for supporting said rods, said means including anti-frictional rollers with said rollers having adjustable members to compensate for wear on said rollers.

23. Draft rod supporting means as called for in claim 22, wherein each roller includes opposed members, one telescopic of the other.

24. Draft rod supporting means as called for in claim 22, wherein adjustable bolts hold said rollers in place, and each roller includes two members with one of said members shiftable by a bolt.

In testimony whereof I affix my signature.

SIDNEY B. WINN.